(12) United States Patent
Benguerah (10) Patent No.: US 9,723,051 B2
(45) Date of Patent: Aug. 1, 2017

(54) SETTING FIRST-PARTY COOKIES BY REDIRECTION

(71) Applicant: Criteo SA, Paris (FR)

(72) Inventor: Omar Benguerah, Paris (FR)

(73) Assignee: Criteo SA, Paris (FR)

(*) Notice: Subject to any disclaimer, the term of this patent is extended or adjusted under 35 U.S.C. 154(b) by 0 days.

(21) Appl. No.: 13/966,004

(22) Filed: Aug. 13, 2013

(65) Prior Publication Data

US 2015/0052217 A1    Feb. 19, 2015

(51) Int. Cl.
| | | |
|---|---|---|
| *G06F 15/16* | (2006.01) | |
| *H04L 29/08* | (2006.01) | |
| *G06Q 30/02* | (2012.01) | |

(52) U.S. Cl.
CPC ............. *H04L 67/02* (2013.01); *G06Q 30/02* (2013.01); *G06Q 30/0251* (2013.01); *G06Q 30/0277* (2013.01)

(58) Field of Classification Search
CPC .................... G06C 30/0251; G06C 30/0264
USPC ........... 709/217–219, 203, 224, 225; 705/14
See application file for complete search history.

(56) References Cited

U.S. PATENT DOCUMENTS

| | | | | |
|---|---|---|---|---|
| 2006/0150253 A1* | 7/2006 | Feuerstein | ............... | G06F 21/55 726/26 |
| 2007/0168506 A1* | 7/2007 | Douglas | ................. | H04L 67/20 709/224 |
| 2009/0024737 A1* | 1/2009 | Goldspink | ............ | G06F 11/3495 709/224 |
| 2009/0172091 A1* | 7/2009 | Hamel | .............. | G06F 17/30902 709/203 |
| 2010/0094704 A1* | 4/2010 | Subramanian | ......... | G06Q 30/02 705/14.45 |
| 2011/0125595 A1* | 5/2011 | Neal | ...................... | G06Q 30/02 705/14.73 |
| 2011/0185016 A1* | 7/2011 | Kandasamy | ........... | G06Q 30/02 709/203 |
| 2011/0225637 A1* | 9/2011 | Counterman | ....... | G06F 21/6245 726/7 |
| 2012/0022942 A1* | 1/2012 | Holloway | ........... | H04L 61/1511 705/14.49 |
| 2012/0297062 A1* | 11/2012 | Lu | ........................ | G06F 11/3495 709/224 |
| 2013/0145022 A1* | 6/2013 | Srivastava | ......... | G06Q 30/0241 709/224 |
| 2013/0275195 A1* | 10/2013 | Gabryelski | ............ | G06Q 30/06 705/14.26 |

* cited by examiner

*Primary Examiner* — Aftab N. Khan
(74) *Attorney, Agent, or Firm* — Proskauer Rose LLP (57) ABSTRACT

A first request on a second domain associated with the computing device is received, by the computing device, from a user device, in response to the user device processing a webpage associated with a first domain. Handler instructions are sent, by the computing device, to the user device. A second request including a target URL is received, by the computing device, from the user device. Setting instructions to set a first cookie on the second domain associated with the computing device and redirection instructions to redirect the user device to the target URL are sent, by the computing device, to the user device.

15 Claims, 9 Drawing Sheets

SETTING FIRST-PARTY COOKIES BY REDIRECTION

FIELD OF THE TECHNOLOGY

The present technology relates generally to setting cookies and, more specifically, to using redirection to set first-party cookies.

BACKGROUND

Online and other electronic advertising allows advertisers to display advertisements (or ads) to users, including those who are potential customers. For example, a publisher webpage can include one or more opportunities for inserting advertisements from third-party advertisers (e.g., space for a banner advertisement across the top of the webpage, spaces for advertisements along the sides of the webpage, overlays, etc.). When a user device (e.g., a computer running a web browser) processes a webpage for display, the user device can request an advertisement for one of the advertising opportunities on the webpage from an ad system. The ad system can select an advertisement for display within the area of the webpage associated with the advertising opportunity. For example, the ad system can select, based on information about the user, a banner ad from a particular advertiser from a set of multiple banner ads from multiple advertisers for display to the user in the banner ad space of the webpage. Ad systems set cookies on user devices to facilitate determining the most relevant ad to display to the user.

Some web browsers do not allow third-party cookies, which can block ad systems from setting cookies. As an example, a browser on a user device visits abc.com in response to a user entering "www.abc.com" into the address field of the browser, and the browser can request a webpage from the webserver on abc.com. The webserver on abc.com can return a webpage (e.g., HTML code) to the browser, along with cookie data to be set as a cookie on the domain "abc.com." The cookie data from abc.com can be referred to as a first-party cookie, and many browsers will store the data as a cookie on the abc.com domain. The webpage source can include references to resources on other domains, such as an HTML image tag with a source address on another domain, e.g., xyz.com. The browser can request the image from a server on xyz.com and the server on xyz.com can return the requested image to the browser, along with data to set as a cookie on the domain "xyz.com." The cookie data from xyz.com can be referred to as a third-party cookie. If the browser is configured to block third-party cookies, the browser will not store the data in a cookie.

As noted above, some ad systems provide data to user devices (e.g., data that when provided back to the ad system allows the ad system to identify the user devices) for storage as cookies. However, some web browsers do not permit setting third-party cookies, and require the user to visit the ad systems domain directly (e.g., by typing the ad system's URL into the address bar) for the ad system to set a cookie on the ad system's domain.

SUMMARY

Accordingly, there is a need for setting third-party data as a cookie (e.g., ad system data) in a browser that blocks third-party cookies. The technology described herein facilitates a party setting a cookie as a first-party using redirection.

In an aspect, there is a method performed by a computing device. The method includes receiving, by the computing device, from a user device, in response to the user device processing a webpage associated with a first domain, a first request on a second domain associated with the computing device. The method includes sending, by the computing device, to the user device, handler instructions. The method includes receiving, by the computing device, from the user device a second request including a target URL. The method includes sending, by the computing device, to the user device setting instructions to set a first cookie on the second domain associated with the computing device and redirection instructions to redirect the user device to the target URL.

In some embodiments, the first request includes a first HTTP request, and the second request includes a second HTTP request. In some embodiments, the user device cookie includes a browser cookie, and the first cookie includes a first-party browser cookie. In some embodiments, the handler instructions include one or more instructions to: detect a link activation of a first link on the webpage; and send to the computing device the second request including the target URL corresponding to the first link. In some embodiments, the setting instructions include an HTTP response including a first-party cookie. In some embodiments, the redirection instructions include an HTTP response including a redirection status code and the target URL. In some embodiments, method further includes sending, by the computing device, to the user device, the handler instructions, if the first request does not include a user device cookie set on the second domain.

In another aspect, there is a method performed by a user device. The method includes receiving, by the user device, a first webpage from a first webserver on a first domain. The method includes sending, by the user device, a first request to a computing device on a second domain. The method includes receiving, by the user device, from the computing device handler instructions. The method includes detecting, by the user device, a link activation of a first link on the first webpage in accordance with the handler instructions, the first link associated with a target URL. The method includes sending, by the user device, to the computing device a second request including the target URL in accordance with the handler instructions. The method includes receiving, by the user device, from the computing device setting instructions to set a browser cookie on the second domain and redirection instructions to redirect the user device to the target URL. The method includes setting, by the user device, the browser cookie on the second domain in accordance with the setting instructions. The method includes requesting, by the user device, from a second webserver a second webpage located at the target URL in accordance with the redirection instructions.

In some embodiments, the first request includes a first HTTP request, and the second request includes a second HTTP request. In some embodiments, the browser cookie includes a first-party browser cookie. In some embodiments, the setting instructions include an HTTP response including the browser cookie. In some embodiments, the redirection instructions include an HTTP response including a redirection status code and the target URL. In some embodiments, method further includes setting, by the user device, a browser cookie on the first domain indicating that the second request was sent; and sending, by the user device, the first request to the computing device on the second domain, if the browser cookie indicating that the second request was sent is not set.

In another aspect, there is a method performed by a user device. The method includes receiving, by the user device, a first webpage including tag instructions from a first webserver on a first domain. The method includes executing, by the user device, the tag instructions to send a first request to a computing device on a second domain. The method includes receiving, by the user device, from the computing device handler instructions in response to the first request. The method includes executing, by the user device, the handler instructions to detect a link activation of a first link on the first webpage, the first link associated with a target URL in accordance with the handler instructions. The method includes executing, by the user device, the handler instructions to determine if the target URL is redirectable. The method includes, if the target URL is determined to be redirectable: executing, by the user device, the handler instructions to form a redirection URL from a computing device URL associated with the computing device and the target URL; executing, by the user device, the handler instructions to send to the computing device a second request including the target URL; receiving, by the user device, from the computing device setting instructions to set a browser cookie on the second domain and redirection instructions to redirect the user device to the target URL; setting, by the user device, the browser cookie on the second domain in accordance with the setting instructions; and sending, by the user device, to a second webserver a third request for a second webpage located at the target URL in accordance with the redirection instructions.

In some embodiments, executing, by the user device, the handler instructions to determine if the target URL is redirectable includes determining, by the user device, if the target URL is on the first domain. In some embodiments, executing, by the user device, the handler instructions to determine if the target URL is redirectable includes determining, by the user device, if the target URL refers to a different webpage than the first webpage. In some embodiments, executing, by the user device, the handler instructions to determine if the target URL is redirectable includes determining, by the user device, if the target URL is less than a pre-determined length. In some embodiments, the first request includes a first HTTP request, and the second request includes a second HTTP request. In some embodiments, the browser cookie includes a first-party cookie. In some embodiments, the setting instructions include an HTTP response including the browser cookie. In some embodiments, the redirection instructions include an HTTP response including a redirection status code and the target URL.

In another aspect, there is a method performed by a computing system. The method includes receiving, by the computing device, from a user device a first request in response to the user device processing a webpage associated with a first domain. The method includes sending, by the computing device, to the user device handler instructions, if the first request does not comprise a user device cookie set on a second domain associated with the computing device. The method includes receiving, by the computing device, from the user device a second request including a target URL. The method includes sending, by the computing device, to the user device setting instructions to set a first cookie on the second domain associated with the computing device and redirection instructions to redirect the user device to the target URL.

In another aspect, there is a method performed by a computing device. The method includes receiving, by the computing device, a first webpage from a first webserver on a first domain. The method includes sending, by the computing device, a first request to an ad system on a second domain. The method includes receiving, by the computing device, from the ad system handler instructions. The method includes detecting, by the computing device, a link activation of a first link on the first webpage in accordance with the handler instructions, the first link associated with a target URL. The method includes sending, by the computing device, to the ad system a second request comprising the target URL in accordance with the handler instructions. The method includes receiving, by the computing device, from the ad system setting instructions to set a cookie on the second domain and redirection instructions to redirect the computing device to the target URL. The method includes setting, by the computing device, the cookie on the second domain in accordance with the setting instructions. The method includes requesting, by the computing device, from a second webserver a second webpage located at the target URL in accordance with the redirection instructions.

In another aspect, there is a method performed by a computing device. The method includes receiving, by the computing device, a first webpage comprising tag instructions from a first webserver on a first domain. The method includes executing, by the computing device, the tag instructions to send a first request to an ad system on a second domain. The method includes receiving, by the computing device, from the ad system handler instructions in response to the first request. The method includes executing, by the computing device, the handler instructions to detect a link activation of a first link on the first webpage, the first link associated with a target URL in accordance with the handler instructions. The method includes executing, by the computing device, the handler instructions to determine if the target URL is redirectable. If the target URL is determined to be redirectable, the method includes executing, by the computing device, the handler instructions to form a rewritten target URL from an ad system URL associated with the ad system and the target URL; executing, by the computing device, the handler instructions to send to the ad system a second request comprising the target URL; receiving, by the computing device, from the ad system setting instructions to set a cookie on the second domain and redirection instructions to redirect the computing device to the target URL; setting, by the computing device, the cookie on the second domain in accordance with the setting instructions; and sending, by the computing device, to a second webserver a third request for a second webpage located at the target URL in accordance with the redirection instructions.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The technology described herein can utilize redirection to facilitate setting cookies as a first-party. In an exemplary application of the technology, a user device requests a first webpage from a first webserver on a first domain (e.g., the domain abc.com). The first webpage contains a script tag with a source attribute specifying a location for the script on an ad system on a second domain. The user device processes the script tag and sends a first request to the ad system on the second domain. The ad system receives the first request, and the ad system sends to the user device handler instructions. The handler instructions can include javascript instructions implementing a handler that listens for a link in the first web page to be clicked and rewrites the clicked link to point to the ad system. The user device can follow the rewritten link to the ad system, passing the original link destination to the ad system. The ad system can send a response to the user device to set a cookie as a first-party and send a redirect response to redirect the user device to the original destination. Beneficially, the described technology can permit a third-party to write a cookie in a manner transparent to the end user.

Environment and Systems

Figure 1:
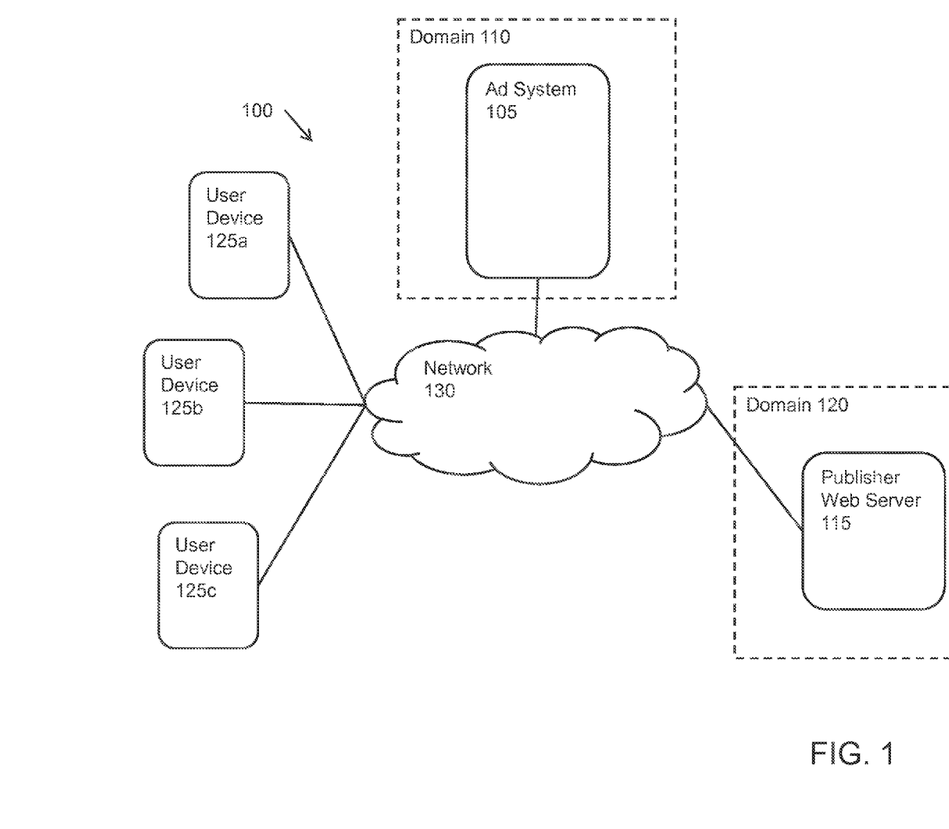
FIG. 1 is a diagram of system in accordance with an embodiment of the technology.

FIG. 1 is a diagram of system 100 in accordance with an embodiment of the technology. As illustrated, system 100 can include an ad system 105 on domain 110, publisher webserver 115 on domain 120, and user devices 125. In system 100, ad system 105, publisher webserver 115, and user devices 125 can be in data communication with each other via network 130.

Ad system 105 can be any computing system comprising one or more computing devices, such as servers. Ad system 105 can be on domain 110 (e.g., domain xyz.com). Generally, a domain can refer to a set of one or more network addresses. For example, multiple computing systems can be on a domain (e.g., abc.com) and/or its subdomains (e.g., def.xyz.com). In some embodiments, ad system 105 can collect information about user devices, such as website browsing activity, online purchasing activity, and/or any other behavioral or demographic information. Ad system 105 can store a cookie (e.g., an HTTP cookie) on user device 125 when communicating with user 125, such as during an HTTP request/response exchange. During subsequent communications between ad system 105 and user device 125, ad system 105 can retrieve the cookie to identify user 125. For example, the cookie can contain an ID that ad system 105 can use to access a record of information about user device 125.

Publisher webserver 115 can be any computing system comprising one or more computing devices, such as servers. Publisher webserver 115 can be on domain 120 (e.g., domain xyz.com). In some embodiments, publisher webserver 110 can serve webpages (e.g., to user devices 125). In the illustrated example, domain 110 can be a different than domain 120. User device 125 can be any computing system comprising one or more computing devices, such as personal computers. In some embodiments, user device 125 can request webpages.

Methods for Setting Cookies

Figure 2:
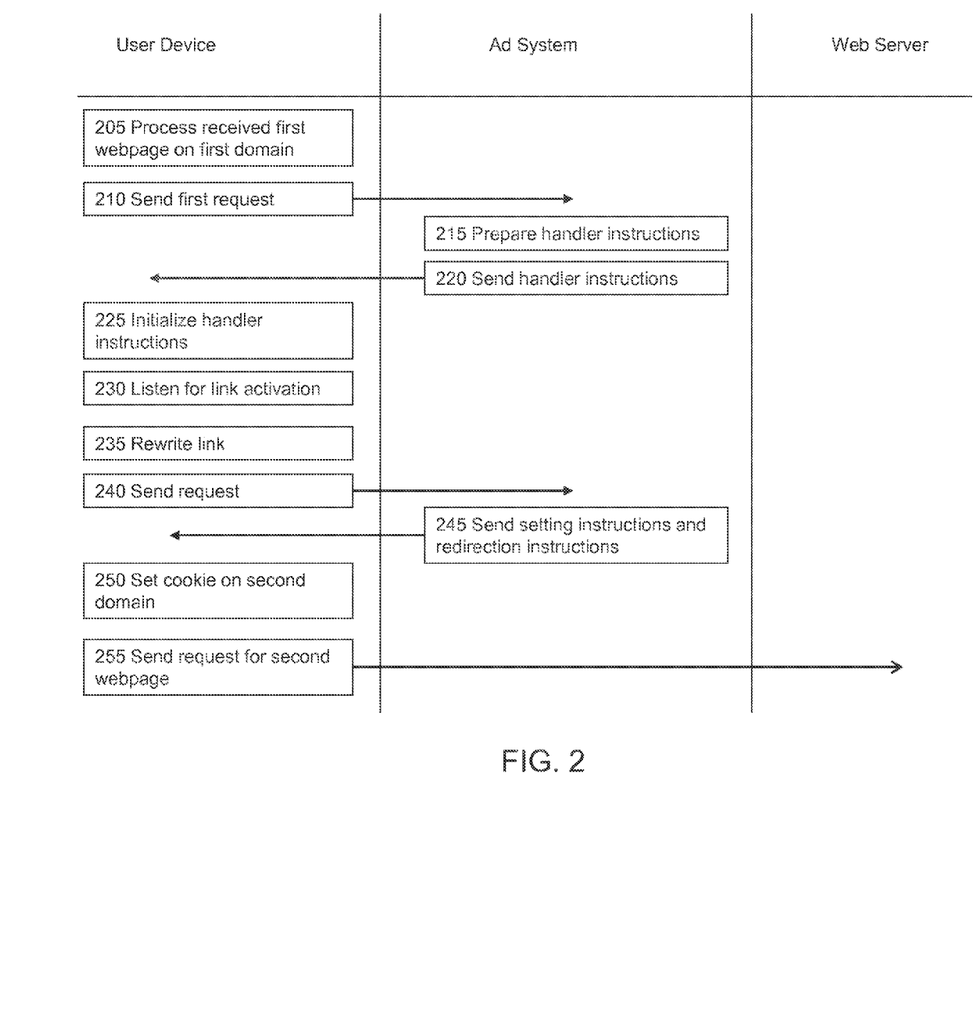
FIG. 2 is a flow chart depicting a method of setting cookies as a first-party.

FIG. 2 is a flow chart depicting a method of setting cookies as a first-party. At step 205, the user device (e.g., user device 125) processes a received first webpage from a first domain. For example, the user device can receive the first webpage from a webserver on a first domain (e.g., publisher web server 115 on domain 120). The first webpage can include tag instructions (e.g., HTML or javascript instructions) that when processed by the user device can cause the user device, at step 210, to send a first request to an ad system on a second domain (e.g., ad system 105 on domain 110). The tag instructions can be, for example, instructions to retrieve HTML or javascript elements from the ad system.

Figure 3:
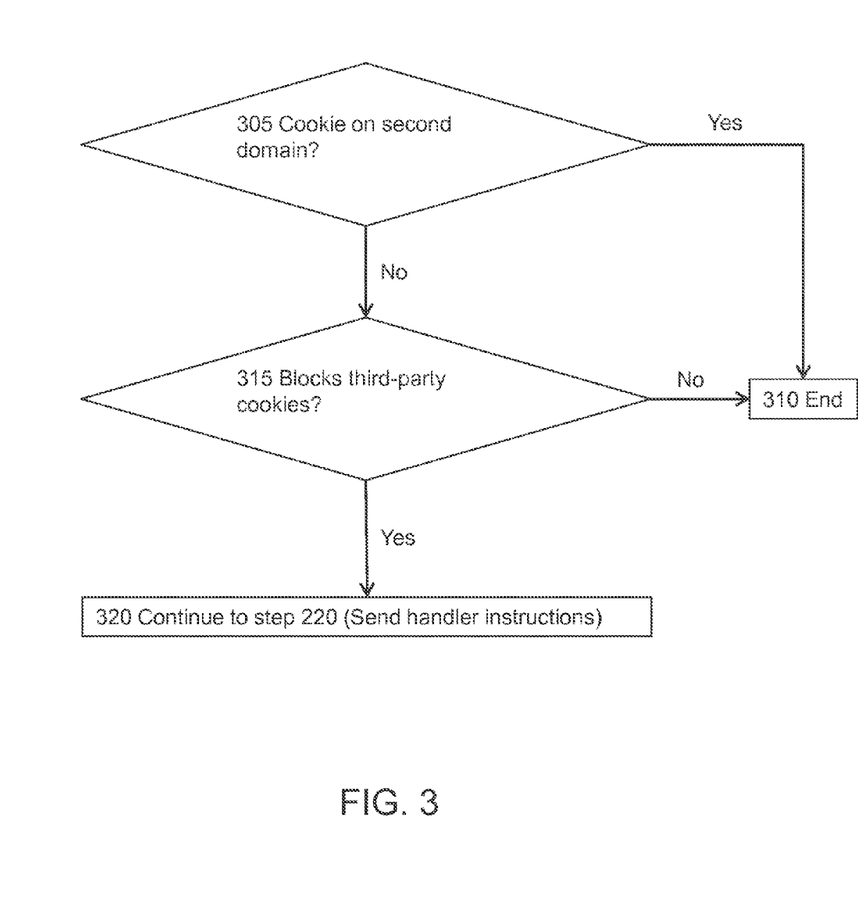
FIG. 3 is a flow chart depicting a method performed by an ad system to determine whether to provide handler instructions.

At step 215, the ad system can prepare handler instructions in response to the first request from the user device. For example, the ad system can retrieve handler instructions (e.g., HTML or javascript instructions) for transmission to the user device. In some embodiments, the ad system can determine whether to send handler instructions to the user device. FIG. 3 is a flow chart depicting a method performed by an ad system to determine whether to provide handler instructions. With reference to FIG. 3, at step 305, the ad system can determine whether a cookie is already set on the second domain (e.g., by determining whether a cookie was included in the HTTP request sent from the user device in step 215). If there is a cookie set on the second domain, the method proceeds to step 310 and ends. In some embodiments, the ad system will not send handler instructions if there is a cookie set on the second domain. If there is no cookie set on the second domain, the method proceeds to step 315. At step 315, the ad system determines whether the user device (e.g., the browser running on the user device) blocks third-party cookies (e.g., by comparing the browser type to a stored list of browsers that block third-party cookies). If the user device does not block third-party cookies, the method proceeds to step 310 and ends. In some embodiments, the ad system will not send handler instructions if the user device does not block third-party cookies. If the user device blocks third-party cookies, the method proceeds to step 320.

Returning to FIG. 2, at step 220, the ad system sends handler instructions to the user device. In some embodiments, the handler instructions can be java script instructions that implement a handler. When executed on a user device, the handler instructions can cause the user device to listen for a link activation (e.g., in response to a user clicking on a link in a webpage). The handler instructions can cause the user device to determine the target URL associated with the link (e.g., the value of the HTML HREF attribute for the link).

In some embodiments, the handler instructions can cause the user device to determine if the target URL is redirectable. In some embodiments, the target URL can be determined not to be redirectable if a previous link activation was rewritten and/or a previous target URL was determined to be redirectable (e.g., a cookie on the first domain can be stored to indicate whether a previous link was found redirectable). In some embodiments, the target URL can be determined not to be redirectable if no 'a' tag (e.g., HTML anchor tag) is found in the activated link's element ancestry. In some embodiments, the target URL can be determined not to be redirectable if the target URL is on a different domain, host, and/or computer system than the first webpage. In some embodiments, the target URL can be determined not to be redirectable if the target URL indicates that, e.g., HTTPS protocol will be used. In some embodiments, the target URL can be determined not to be redirectable if the target URL does not begin with "HTTP." In some embodiments, the target URL can be determined not to be redirectable if the target contains an HTTP anchor and/or is an internal reference to the first webpage. In some embodiments, the target URL can be determined not to be redirectable if the target URL is longer than a pre-determined length (e.g., 4000 characters).

The handler instructions can cause the user device to rewrite the target URL to form a rewritten target URL from a URL associated with the ad system and the target URL. For example, if the target URL is "abc.com/info.html" and the URL associated with the ad system is "xyz.com/redirect," the rewritten target URL can be "xyz.com/redirect?dest=abc.com/info.html". The handler instructions can cause the user device to send a request to the rewritten target URL (e.g., an HTTP request). In some embodiments, if the target URL is not redirectable, the handler instructions can cause the user device to send the request to the target URL. If the target URL is redirectable, the handler instructions can cause the user device to send the request to the target URL. The handler instructions can cause the user device to store a cookie on a first domain indicating that a previous link was found redirectable.

Figure 4:
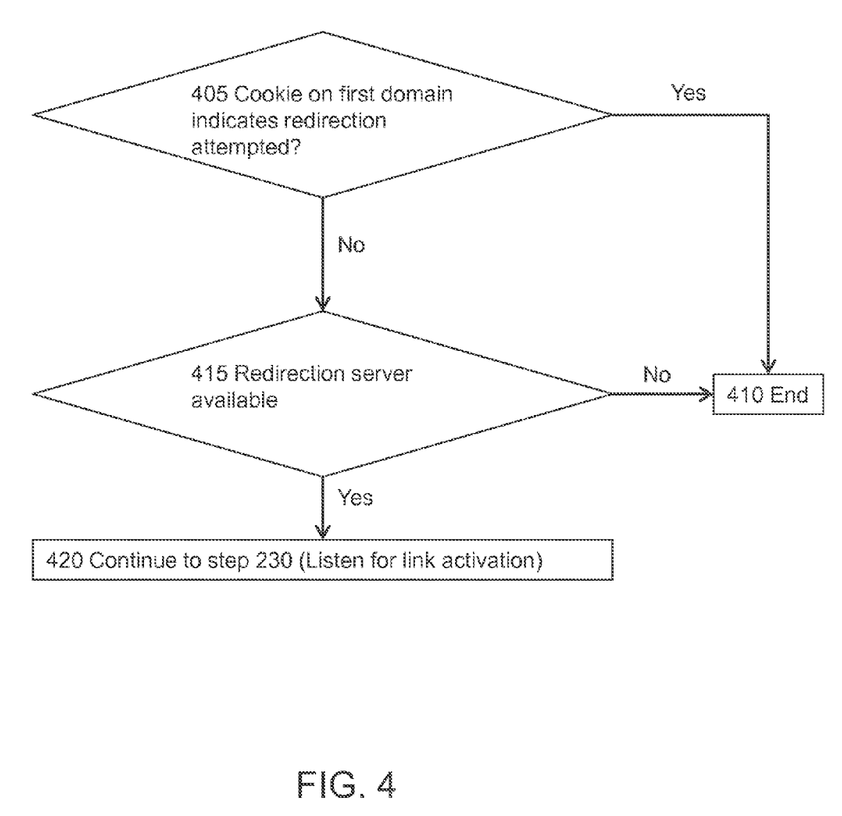
FIG. 4 is a flow chart depicting a method performed by a user device to determine whether to listen for link activation.
Figure 5:
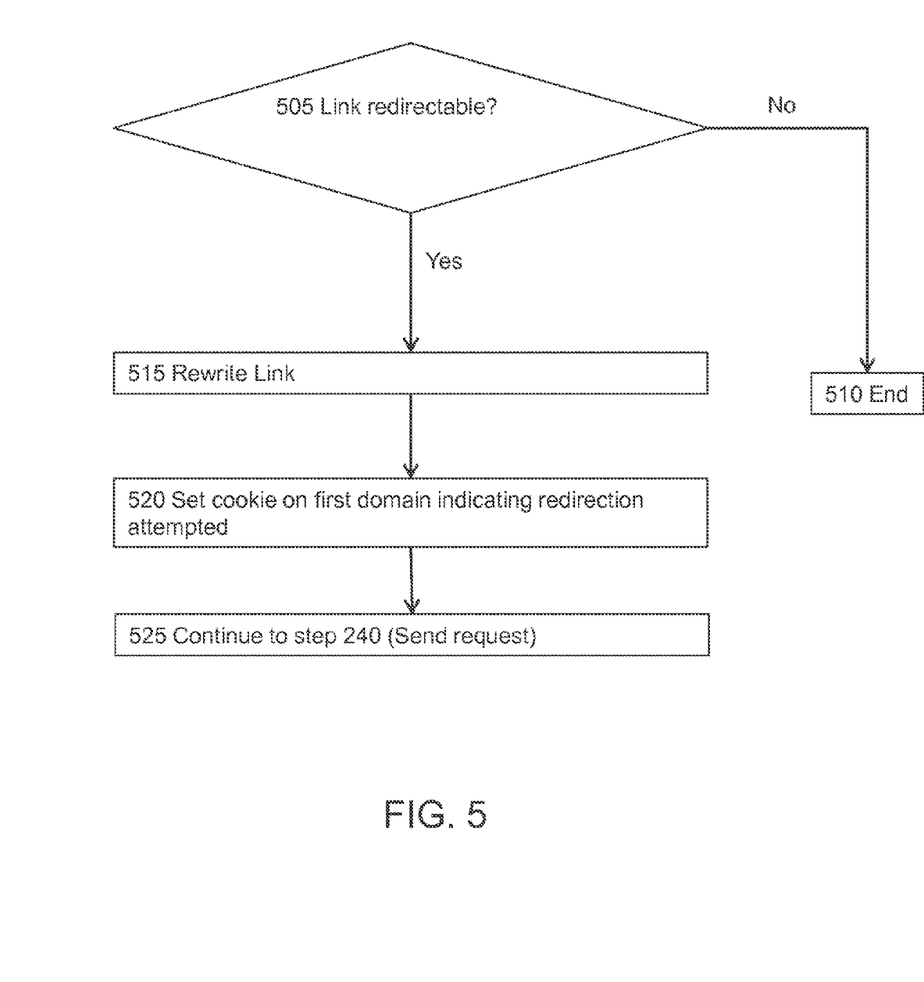
FIG. 5 is a flow chart depicting a method performed by a user device to determine if a link is redirectable.

At step 225, the user device initializes the handler instructions. As discussed above, the handler instructions can be, for example, javascript. In some embodiments, initializing the handler instructions can include adding the javascript handler instructions to the DOM of the first webpage for execution. FIG. 4 is a flow chart depicting a method performed by a user device to determine whether to listen for link activation. For example, the user device can perform the method during initialization to determine if it will attempt to rewrite links. With reference to FIG. 4, at step 405 the user device determines whether a cookie is set on the first domain that indicates redirection was attempted. If a cookie is set, the process proceeds to step 410 and ends. If a cookie is not set, the process proceeds to step 415. At step 415, the user device determines whether a redirection server (e.g., an ad system) is available. If a redirection server is not available, the process proceeds to step 410 and ends. If a redirection service is available, the process proceeds to step 420. Returning to FIG. 2, at step 230, the user device, executing the handler instructions, listens for a link activation. At step 235, the user device rewrites the activated link. FIG. 5 is a flow chart depicting a method performed by a user device to determine if a link is redirectable. With reference to FIG. 5, at step 505 the user device determines whether the link is redirectable (e.g., using any of the above-described criteria). If the link is not redirectable, the method proceeds to step 510 and ends. If the link is redirectable, the method proceeds to step 515. At step 515, the user device rewrites the link (e.g., as described above). At step 520, the user device sets a cookie on the first domain indicating that redirection has been attempted (e.g., a link was rewritten). At step 525 the user device continues to step 240.

Returning to FIG. 2, at step 240, the user device sends a second request to the ad system. In some embodiments, the second request can be an HTTP request to the rewritten target URL. At step 245, the ad system sends setting instructions and redirection instructions to the user device. The setting instructions can be instructions to set a cookie on the second domain. Beneficially, because the HTTP request was made to the second domain, the cookie can be allowed by the user device, even if the user device blocks third-party cookies. The redirection instructions can be instructions to redirect the user device to the target URL (e.g., ad system can respond to an HTTP request with a redirection response message containing the target URL). At step 250, the user device sets a cookie on the second domain in accordance with the setting instructions. At step 255, the user device sends a third request to a webserver (e.g., the webserver hosting the resource identified by the target URL).

Figure 6:
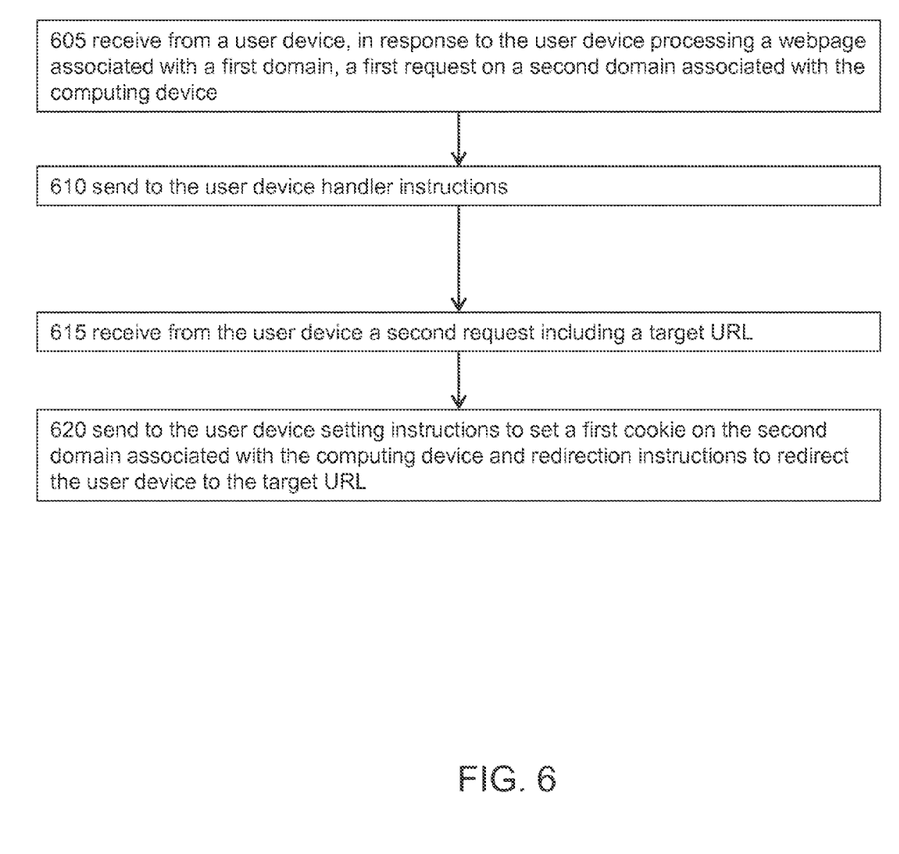
FIG. 6 is a flow chart depicting a method performed by an ad system.

FIG. 6 is a flow chart depicting a method performed by an ad system. At step 605, the ad system receives from a user device, in response to the user device processing a webpage associated with a first domain, a first request on a second domain associated with the computing device (e.g., as described with respect to step 210 of FIG. 2). At step 610, the ad system sends to the user device handler instructions (e.g., as described with respect to steps 215 and/or 220 of FIG. 2). In some embodiments, the ad system sends to the user device handler instructions, if the first request does not include a user device cookie set on a second domain associated with the computing device. At step 615, the ad system receives from the user device a second request including a target URL (e.g., as described with respect to step 240 of FIG. 2). At step 620, the ad system sends to the user device setting instructions to set a first cookie on the second domain associated with the computing device and redirection instructions to redirect the user device to the target URL (e.g., as described with respect to step 245 of FIG. 2).

Figure 7:
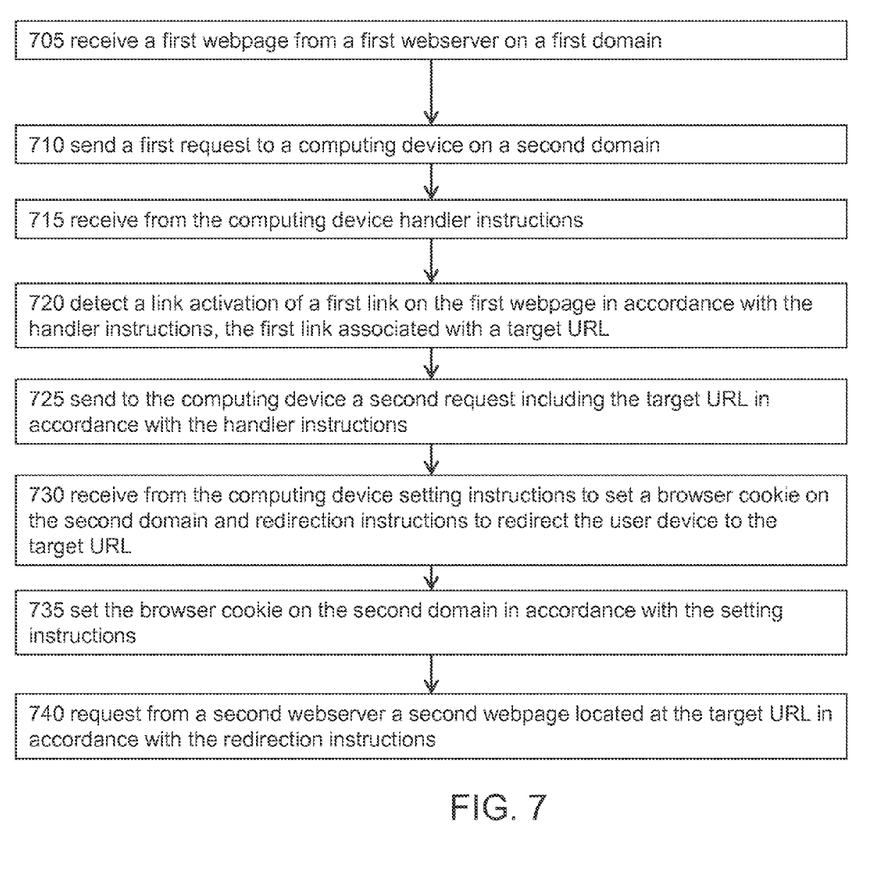
FIG. 7 is a flow chart depicting a method performed by a user device.

FIG. 7 is a flow chart depicting a method performed by a user device. At step 705, the user device receives a first webpage from a first webserver on a first domain (e.g., as described with respect to step 205 of FIG. 2). At step 710, the user device sends a first request to an ad system on a second domain (e.g., as described with respect to step 210 of FIG. 2). At step 715, the user device receives from the ad system handler instructions (e.g., as described with respect to steps 220 and/or 225 of FIG. 2). At step 720, the user device detects a link activation of a first link on the first webpage in accordance with the handler instructions, the first link associated with a target URL (e.g., as described with respect to steps 225-235 of FIG. 2). At step 725, the user device sends to the ad system a second request including the target URL in accordance with the handler instructions (e.g., as described with respect to step 240 of FIG. 2). At step 730, the user device receives from the ad system setting instructions to set a cookie on the second domain and redirection instructions to redirect the computing device to the target URL (e.g., as described with respect to step 245 of FIG. 2). At step 735, the user device sets the cookie on the second domain in accordance with the setting instructions (e.g., as described with respect to step 250 of FIG. 2). At step 740, the user device requests from a second webserver a second webpage located at the target URL in accordance with the redirection instructions (e.g., as described with respect to step 255 of FIG. 2).

Figure 8A:
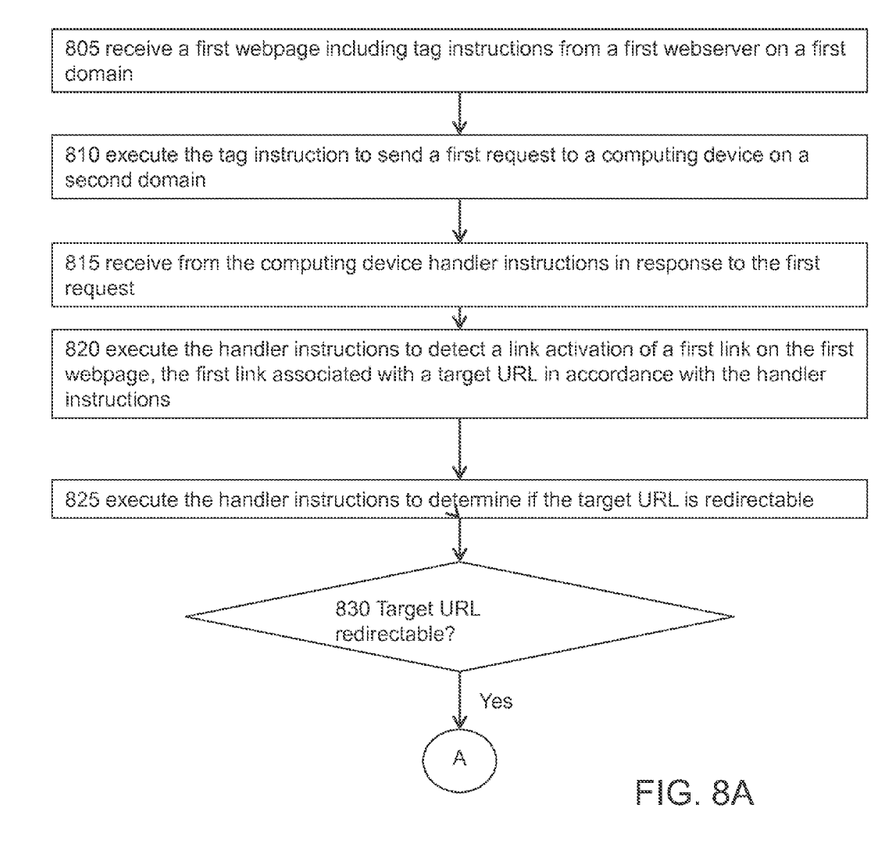
FIGS. 8A and 8B are a flow chart depicting a method performed by a user device.
Figure 8B:
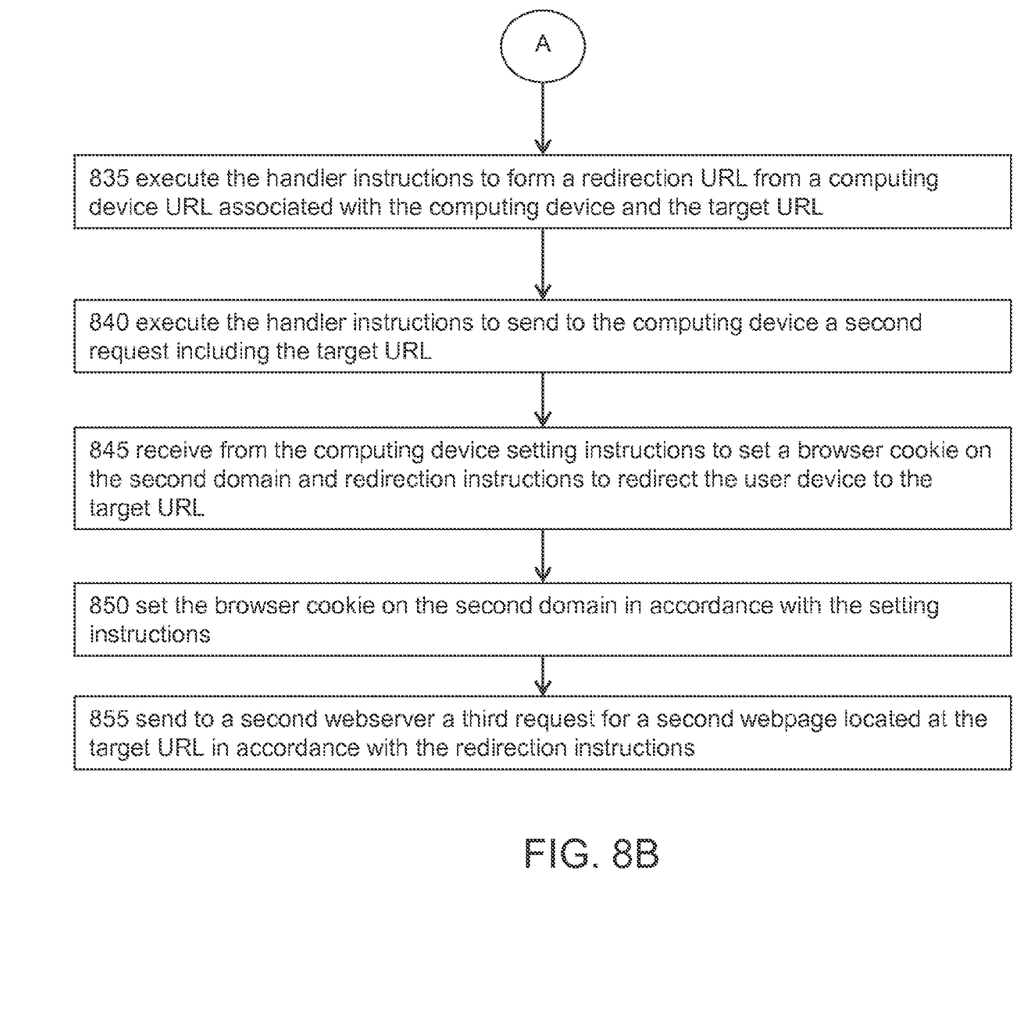

FIGS. 8A and 8B are a flow chart depicting a method performed by a user device. At step 805, the user device receives a first webpage including tag instructions from a first webserver on a first domain (e.g., as described with respect to step 205 of FIG. 2). At step 810, the user device executes the tag instructions to send a first request to a computing device on a second domain (e.g., as described with respect to step 205 of FIG. 2). At step 815, the user device receives from the computing device handler instructions in response to the first request (e.g., as described with respect to steps 220 and/or 225 of FIG. 2). At step 820, the user device executes the handler instructions to detect a link activation of a first link on the first webpage, the first link associated with a target URL in accordance with the handler instructions (e.g., as described with respect to steps 225-235 of FIG. 2). At step 825, the user device executes the handler instructions to determine if the target URL is redirectable (e.g., as described with respect to steps 225-235 of FIG. 2). At step 830, the user device determines whether the Target URL is redirectable (e.g., as described with respect to steps 225-235 of FIG. 2). If the Target URL is redirectable, the method proceeds to step 835. At step 835, the user device executes the handler instructions to form a redirection URL from a computing device URL associated with the computing device and the target URL (e.g., as described with respect to steps 225-235 of FIG. 2). At step 840, the user device executes the handler instructions to send to the computing device a second request including the target URL (e.g., as described with respect to step 240 of FIG. 2). At step 845, the user device receives from the computing device setting instructions to set a browser cookie on the second domain and redirection instructions to redirect the user device to the target URL (e.g., as described with respect to step 245 of FIG. 2). At step 850, the user device sets the browser cookie on the second domain in accordance with the setting instructions (e.g., as described with respect to step 250 of FIG. 2). At step 855, the user device sends to a second webserver a third request for a second webpage located at the target URL in accordance with the redirection instructions (e.g., as described with respect to steps 255 of FIG. 2).

Some embodiments of the technology are described above with reference to webpages. It should be appreciated that the technology can be applied to selecting and/or providing advertisements for any digital asset that includes one or more impression opportunities. Digital assets can include webpages, multi-media items, applications, etc. As an example, the technology can be applied to selecting and/or providing advertisements for display in impression opportunities in an application (e.g., an application on a personal computer, an application on a mobile computing device, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A method performed by a computing device comprising:
  a. receiving, by the computing device, from a user device, in response to the user device processing a first webpage associated with a first domain, a first request on a second domain associated with the computing device;
  b. sending, by the computing device, to the user device, handler instructions, wherein the handler instructions comprise one or more instructions for the user device to detect a link activation of a first link on the first webpage, and send to the computing device a second request comprising the target URL corresponding to the first link;
  c. executing, by the user device, the handler instructions to determine if the target URL is redirectable, including determining if the target URL is less than a predetermined length, wherein the target URL refers to a second webpage;
  d. receiving, by the computing device, from the user device, the second request comprising the target URL; and
  e. sending, by the computing device, to the user device, setting instructions to set a first cookie on the second domain associated with the computing device and redirection instructions to redirect the user device to the target URL, wherein the redirection instructions include an HTTP response comprising a redirection status code and the target URL.

2. The method of claim 1, wherein the first request comprises a first HTTP request, and the second request comprises a second HTTP request.

3. The method of claim 1, wherein the user device cookie comprises a browser cookie, and the first cookie comprises a first-party browser cookie.

4. The method of claim 1, wherein the setting instructions comprise an HTTP response comprising a first-party cookie.

5. The method of claim 1, further comprising:
  sending, by the computing device, to the user device, the handler instructions, if the first request does not comprise a user device cookie set on the second domain.

6. A method performed by a user device comprising:
  a. receiving, by the user device, a first webpage from a first webserver on a first domain;
  b. sending, by the user device, a first request to a computing device on a second domain;
  c. receiving, by the user device, from the computing device, handler instructions;
  d. detecting, by the user device, a link activation of a first link on the first webpage in accordance with the handler instructions, the first link associated with a target URL;
  e. executing, by the user device, the handler instructions to determine if the target URL is redirectable, including determining if the target URL is less than a predetermined length, wherein the target URL refers to a second webpage;
  f. sending, by the user device, to the computing device, a second request comprising the target URL in accordance with the handler instructions;
  g. receiving, by the user device, from the computing device, setting instructions to set a browser cookie on the second domain and redirection instructions to redirect the user device to the target URL, wherein the redirection instructions include an HTTP response comprising a redirection status code and the target URL;
  h. setting, by the user device, the browser cookie on the second domain in accordance with the setting instructions; and
  i. requesting, by the user device, from a second webserver, the second webpage located at the target URL in accordance with the redirection instructions.

7. The method of claim 6, wherein the first request comprises a first HTTP request, and the second request comprises a second HTTP request.

8. The method of claim 6, wherein the browser cookie comprises a first-party browser cookie.

9. The method of claim 6, wherein the setting instructions comprise an HTTP response comprising the browser cookie.

10. The method of claim 6, further comprising:
  sending, by the user device, the first request to the computing device on the second domain, if the browser cookie on the first domain indicating that the second request was sent is not set; and setting, by the user device, a browser cookie on the first domain indicating that the second request was sent.

11. A method performed by a user device, the method comprising:
  a. receiving, by the user device, a first webpage comprising tag instructions from a first webserver on a first domain;
  b. executing, by the user device, the tag instructions to send a first request to a computing device on a second domain;
  c. receiving, by the user device, from the computing device, handler instructions in response to the first request;
  d. executing, by the user device, the handler instructions to detect a link activation of a first link on the first webpage, the first link associated with a target URL in accordance with the handler instructions;
  e. executing, by the user device, the handler instructions to determine if the target URL is redirectable, wherein the target URL refers to a second webpage;
  f. if the target URL is determined to be redirectable:
    i. executing, by the user device, the handler instructions to form a redirection URL from a computing device URL associated with the computing device and the target URL;
    ii. executing, by the user device, the handler instructions to send to the computing device a second request comprising the target URL, including determining if the target URL is less than a predetermined length;
    iii. receiving, by the user device, from the computing device, setting instructions to set a browser cookie on the second domain and redirection instructions to redirect the user device to the target URL, wherein the redirection instructions include an HTTP response comprising a redirection status code and the target URL;
    iv. setting, by the user device, the browser cookie on the second domain in accordance with the setting instructions; and
    v. sending, by the user device, to a second webserver, a third request for the second webpage located at the target URL in accordance with the redirection instructions.

12. The method of claim 11, wherein executing, by the user device, the handler instructions to determine if the target URL is redirectable comprises:
  determining, by the user device, if the target URL is on the first domain.

13. The method of claim 11, wherein the first request comprises a first HTTP request, and the second request comprises a second HTTP request.

14. The method of claim 11, wherein the browser cookie comprises a first-party cookie.

15. The method of claim 11, wherein the setting instructions comprise an HTTP response comprising the browser cookie.

* * * * *